(12) United States Patent
Boban et al.

(10) Patent No.: US 10,291,285 B2
(45) Date of Patent: May 14, 2019

(54) METHODS FOR PERFORMING MULTI-DISTURBER ALIEN CROSSTALK LIMITED SIGNAL-TO-NOISE RATIO TESTS

(71) Applicant: CommScope, Inc. of North Carolina, Hickory, NC (US)

(72) Inventors: Benji Boban, Rowlett, TX (US); George Zimmerman, Rolling Hills Estates, CA (US)

(73) Assignee: CommScope, Inc. of North Carolina, Hickory, NC (US)

( * ) Notice: Subject to any disclaimer, the term of this patent is extended or adjusted under 35 U.S.C. 154(b) by 445 days.

(21) Appl. No.: 15/343,237

(22) Filed: Nov. 4, 2016

(65) Prior Publication Data

US 2017/0134069 A1    May 11, 2017

Related U.S. Application Data (60) Provisional application No. 62/252,902, filed on Nov. 9, 2015.

(51) Int. Cl.
*H04J 1/12* (2006.01)
*H04J 1/16* (2006.01)
*H04B 3/487* (2015.01)

(52) U.S. Cl.
CPC ............ *H04B 3/487* (2015.01); *H04J 1/12* (2013.01); *H04J 1/16* (2013.01)

(58) Field of Classification Search
CPC . H04B 3/487; H04B 3/32; H04B 3/34; H04B 3/46; H04B 3/466; H04J 1/00; H04J 1/12; H04J 1/16; H04W 72/0446; H04W 76/28; H04L 5/14; H04M 3/34; H04N 17/00
See application file for complete search history.

(56) References Cited

U.S. PATENT DOCUMENTS 4,172,263 A * 10/1979 Tenten .................. H04N 17/00
                                                                    348/193
5,943,604 A *  8/1999 Chen ...................... H04B 3/38
                                                                    348/193
(Continued)

FOREIGN PATENT DOCUMENTS

EP        1300964     * 11/2008
JP     2013-229892      11/2013

OTHER PUBLICATIONS

Draft Proposed American national Standard, "Spectrum Management for Loop Transmission Systems," Committee T1—Telecommunications, Working Group T1E1.4, Nov. 28, 2000.
(Continued)

*Primary Examiner* — Afsar M Qureshi
(74) *Attorney, Agent, or Firm* — Myers Bigel, P.A.

(57) ABSTRACT

Methods of performing a multi-disturber alien crosstalk limited signal-to-noise ratio test are provided in which at least one signal-to-alien crosstalk noise ratio is determined for a victim link segment using a composite power spectral density for at least a first of a plurality of disturber link segments. The composite power spectral density comprises a combination of portions of a plurality of power spectral densities that are associated with line rates at which the first of the plurality of disturber link segments may operate.

20 Claims, 6 Drawing Sheets

(56) References Cited

U.S. PATENT DOCUMENTS

| | | | | | |
|---|---|---|---|---|---|
| 6,542,276 | B1* | 4/2003 | Laroia | ............ | H04B 10/505 |
| | | | | | 398/192 |
| 7,158,563 | B2 | 1/2007 | Ginis et al. | | |
| 10,097,237 | B1* | 10/2018 | Sedarat | ............ | H04B 3/32 |
| 10,230,425 | B1* | 3/2019 | Gomez Martinez | ..... | H04B 3/32 |
| 2006/0114977 | A1* | 6/2006 | Ginis | ............ | H04B 3/32 |
| | | | | | 375/222 |
| 2008/0049855 | A1* | 2/2008 | Duvaut | ............ | H04B 3/32 |
| | | | | | 375/260 |
| 2011/0235692 | A1* | 9/2011 | Kanellakopoulos | ..... | H04B 3/32 |
| | | | | | 375/222 |
| 2013/0142319 | A1* | 6/2013 | Lu | ............ | H04B 3/32 |
| | | | | | 379/93.08 |
| 2015/0264503 | A1* | 9/2015 | Hall | ............ | H04R 3/002 |
| | | | | | 381/303 |
| 2017/0012718 | A1* | 1/2017 | Kota | ............ | H04B 17/318 |

OTHER PUBLICATIONS

Ginis, G. & Peng, CN. EURASIP J. Adv. Signal Process. (2006) 2006: 016828. doi:10.1155/ASP/2006/16828.

Prabin Kumar Pandey et al., "MMSE-Based Partial Crosstalk Cancellation for Upstream VDSL," IEEE International Conference on Communications (ICC) Jul. 1, 2010.

Notification of Transmittal of the International Search Report and the Written Opinion of the International Searching Authority, or the Declaration, for corresponding Application No. PCT/US2016/060463, dated Mar. 7, 2017, 11 pages.

* cited by examiner

METHODS FOR PERFORMING MULTI-DISTURBER ALIEN CROSSTALK LIMITED SIGNAL-TO-NOISE RATIO TESTS

CROSS-REFERENCE TO RELATED APPLICATION

The present application claims priority under 35 U.S.C. § 119 to U.S. Provisional Patent Application Ser. No. 62/252,902, filed Nov. 9, 2015, the entire content of which is incorporated herein by reference.

FIELD OF THE INVENTION

The present invention relates generally to communications systems and, more particularly, to methods for characterizing the performance of link segments in such communications systems.

BACKGROUND

Figure 1:
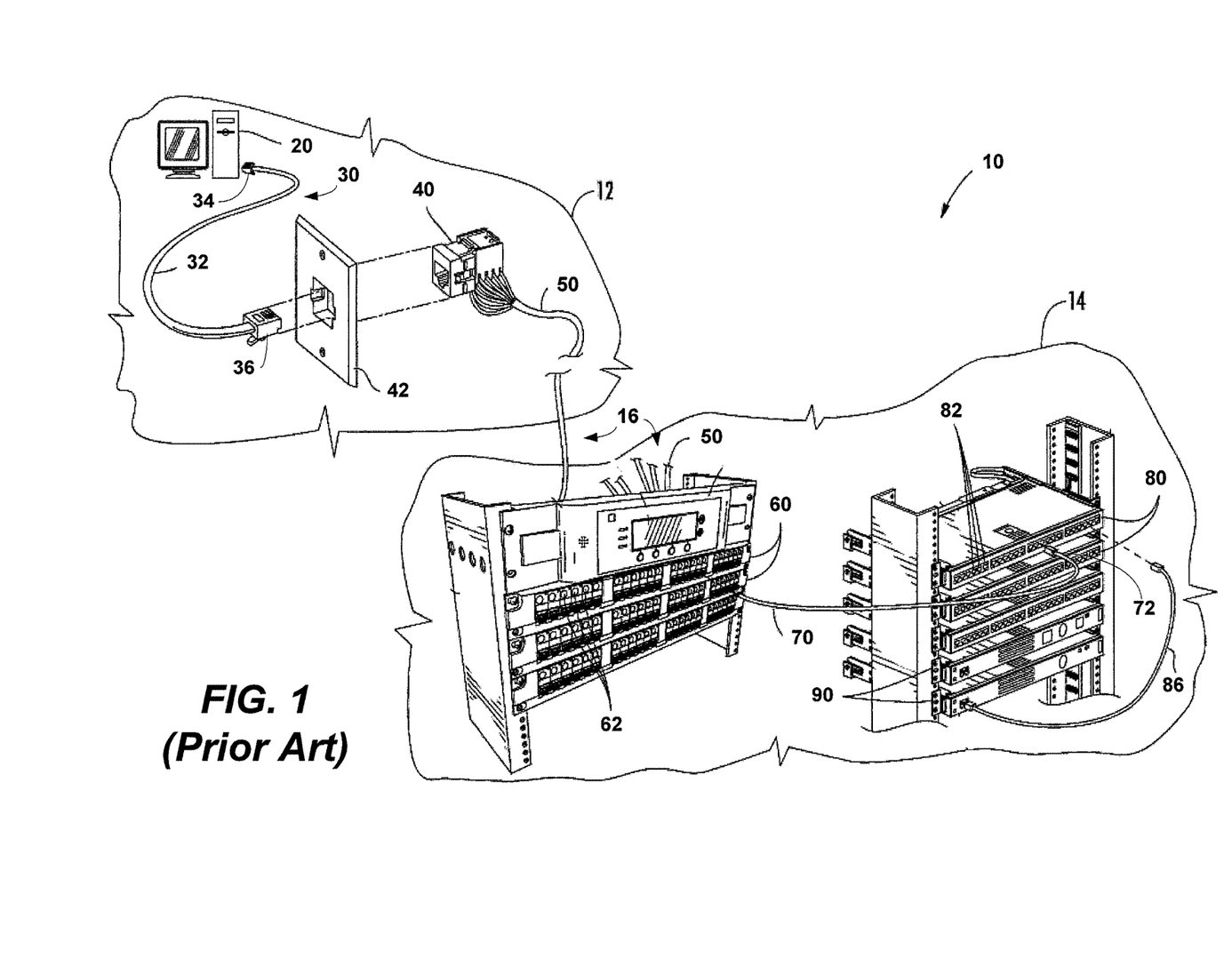
FIG. 1 is a schematic drawing that illustrates the conventional use of communications plug jack connectors to connect a computer to network equipment.

Computers, fax machines, printers and other electronic devices are routinely connected by communications cables and connectors to network equipment and/or to external networks such as the Internet. FIG. 1 illustrates a communications system 10 in which a computer 20 that is located in a work area 12 of a building is connected to network equipment 80, 90 using conventional communications cables and connectors. As shown in FIG. 1, the computer 20 is connected by a patch cord 30 to a communications jack 40 that is mounted in a wall (not shown) using a wall plate 42. The patch cord 30 comprises a communications cable 32 that contains a plurality of individual conductors (e.g., insulated copper wires) and communications plugs 34, 36 that are attached to the respective ends of the cable 32. The communications plug 34 is inserted into a communications jack (not pictured in FIG. 1) that is provided in the computer 20, and the communications plug 36 inserts into a plug aperture in the front side of the communications jack 40. The blades of communications plug 36 mate with respective contacts of the communications jack 40 when the communications plug 36 is inserted into the plug aperture of jack 40. The blades of communications plug 34 similarly mate with respective contacts of the communications jack (not pictured in FIG. 1) that is provided in the computer 20.

The communications jack 40 includes a back-end wire connection assembly that receives and holds conductors from a so-called "horizontal" cable 50. As shown in FIG. 1, each conductor of horizontal cable 50 is individually pressed into a respective one of a plurality of slots provided in the back-end wire connection assembly of jack 40 to establish mechanical and electrical connection between each conductor of cable 50 and the communications jack 40. The other end of each conductor in cable 50 may be connected to, for example, the back end wire connection assembly of a connector port 62 of a patch panel 60 that is located in a computer room 14. A first plug of a patch cord 70 may be inserted into the connector port 62, and a second plug 72 of the patch cord 70 may be inserted into a connector port 82 of a network switch 80. The connector port 82 on the network switch 80 may be connected to other network equipment such as, for example, a server 90, via another patch cord 86. The patch cord 30, the communications jack 40, the horizontal cable 50, the connector port 62, and the patch cord 70 provide a plurality of signal transmission paths over which information signals may be communicated between the computer 20 and the network switch 80.

The above-described cables and connectors each include eight conductors that are arranged as four differential pairs of conductors. Information signals are transmitted between the end devices over these differential pairs of conductors rather than over a single conductor using differential signaling techniques. The cascade of cables and connectors that extend between the connector port 82 on the network switch 80 and an end device such as computer 20 is commonly referred to as a "channel" or as a "link segment" 16. Each link segment 16 thus has four differential pairs that can carry four separate differential information signals. In these link segments 16, when a plug mates with a jack, the proximities and routings of the conductors and contacting structures within the jack and/or plug can produce capacitive and/or inductive couplings. Moreover, since four differential pairs are bundled together in each cable, additional capacitive and/or inductive coupling may occur between the differential pairs within each cable. These capacitive and inductive couplings in the connectors and cabling give rise to a type of noise that is called "crosstalk."

"Crosstalk" in a communication system refers to unwanted signal energy that is induced onto the conductors of a first "victim" differential pair from a signal that is transmitted over a second "disturber" differential pair. The induced crosstalk may include both near-end crosstalk (NEXT), which is the crosstalk measured at an input location corresponding to a source at the same location (i.e., crosstalk whose induced voltage signal travels in an opposite direction to that of an originating, disturber signal in a different path), and far-end crosstalk (FEXT), which is the crosstalk measured at the output location corresponding to a source at the input location (i.e., crosstalk whose signal travels in the same direction as the disturber signal in the different path). Both types of crosstalk comprise an undesirable noise signal that interferes with the information signal on the victim differential pair.

Crosstalk that arises between two differential pairs that are part of the same link segment is typically referred to as "internal" crosstalk. Because communications cables are often bundled together for routing through the walls, floors and/or ceilings of buildings and/or because communications connectors are often located in very close proximity to each other in, for example, patch panels and switches, crosstalk may also occur between one or more differential pairs of a first link segment and one or more differential pairs of a second link segment. Such crosstalk between differential pairs of different link segments is typically referred to as "alien" crosstalk.

Techniques have been developed for reducing the amount of internal and alien crosstalk that is present so that higher data rate signals may be transmitted over the above described link segments. In the mid- to late-1990s, so-called "Category 5E" cables and connectors were developed that could operate at frequencies of up to 100 MHz and support data rates of up to 1000 Mbps for channel lengths of up to 100 meters. Such communications are commonly referred to as 1000Base-T communications. As crosstalk compensation techniques were improved, higher performance "Category 6" cables and connectors were introduced that were designed to operate at frequencies of up to 250 MHz and to support data rates of up to 10 Gbps, although only for shorter channel lengths (e.g., 37-55 meters). These higher data rate communications are commonly referred to as 10GBase-T communications. More recently, even higher performance "Category 6A" cables and connectors were introduced that were designed to operate at frequencies of up to 500 MHz, and to support 10GBase-T communications (10 Gbps) for channel lengths of up to 100 meters.

There are a large number of installed communications systems that use Category 5E or Category 6 connectors and cables. As user demand for higher data rates continues to increase with the proliferation of, for example, video streaming and high definition video, in some cases the hard-wired communications system may be a choke point that slows down data delivery to the user. In an effort to improve performance without the need to replace the large installed base of cabling and connectors, it has been proposed that existing communications systems can be tested and the link segments that will support higher data rates can be identified and thereafter used at the higher data rates.

SUMMARY

Pursuant to some embodiments of the present invention, methods of performing a multi-disturber alien crosstalk limited signal-to-noise ratio test are provided in which at least one signal-to-alien crosstalk noise ratio is determined for a victim link segment using a composite power spectral density for a first of a plurality of disturber link segments. The composite power spectral density comprises a combination of portions of a plurality of power spectral densities that are associated with line rates at which the first of the plurality of disturber link segments may operate.

In some embodiments of these methods, an alien crosstalk noise contribution may be determined for the first of the plurality of disturber link segments using the composite power spectral density for a first of a plurality of disturber link segments, wherein the composite power spectral density accounts for any power back-offs at which the first of the plurality of disturber link segments would operate when transmitting signals at the respective line rates. In such embodiments, different portions of the composite power spectral density may be adjusted different amounts to account for different power back-offs that apply when the first of the plurality of disturber link segments operates at different line rates.

In some embodiments of these methods a signal power of the victim link segment may be determined for the signal-to-alien crosstalk noise ratio using one of the plurality of power spectral densities that corresponds to a specific line rate for the victim link segment.

In some embodiments, the at least one signal-to-alien crosstalk noise ratio may be determined using respective composite power spectral densities for each of the plurality of disturber link segments.

In some embodiments, the victim link segment may have previously been operated at a first line rate, and the method may further include operating the victim link segment at a higher line rate if the signal-to-alien crosstalk noise ratio for each differential pair of the victim link segment exceeds respective thresholds.

In some embodiments, the composite power spectral density may be a worst case composite power spectral density that is formed by assigning, at each of a plurality of frequencies within the operating frequency band of the victim link segment operating at a first line rate, the highest power level from the plurality of power spectral densities that are associated with line rates at which the first of the disturber link segments may operate.

Pursuant to further embodiments of the present invention, methods of determining the supportable data rate on a victim link segment of a communications system are provided in which a plurality of disturber link segments are identified for the victim link segment. The alien crosstalk noise from each differential pair of each disturber link segment to each differential pair of the victim link segment is determined using a respective composite power spectral density for each disturber link segment to quantify the alien crosstalk noise that is coupled to each differential pair of the victim link segment from each differential pair of each of the disturber link segments, wherein each composite power spectral density is a piecewise combination of portions of a plurality of power spectral densities that are associated with line rates at which the disturber link segments may operate.

In some embodiments, insertion loss values may be determined for each of the disturber link segments and the victim link segment.

In some embodiments, near end alien crosstalk and far end alien crosstalk transfer functions may be determined from each differential pair of each of the disturber link segments to each differential pair of the victim link segment.

In some embodiments, a power spectral density with power back-off for the victim link segment may be determined based on a pre-selected line rate for the victim link segment.

In some embodiments, a worst case estimate of a total alien crosstalk noise that couples onto a differential pair of the victim link segment from the differential pairs of each of the plurality of disturber link segments may be determined for each differential pair of the victim link segment.

In some embodiments, the signal-to-alien crosstalk noise ratio may be determined for each differential pair of the victim link segment using the power spectral density with power back-off for the victim link segment and the worst case estimate of the total alien crosstalk noise that is coupled onto each differential pair of the victim link segment from the differential pairs of each of the plurality of disturber link segments.

In some embodiments, the signal-to-alien crosstalk noise ratio for each differential pair of the victim link segment may be compared to respective thresholds.

In some embodiments, each composite power spectral density may be a worst case composite power spectral density that is formed by setting the power at each frequency based on the highest power level at the frequency in the plurality of power spectral densities.

In some embodiments, the power levels in each composite power spectral density may be adjusted to take into account any power back-off that each of the disturber link segments would apply when operating at the different line rates at which the disturber link segments may operate.

In some embodiments, different portions of the first of the composite power spectral densities may be adjusted by different amounts to account for different power back-offs that apply when a first of the plurality of disturber link segments operates at different line rates.

Pursuant to still further embodiments of the present invention, methods of performing a multi-disturber alien crosstalk limited signal-to-noise ratio test are provided in which the line rates at which a plurality of disturber link segments may operate are determined. A power spectral density associated with each determined line rate is identified. At least two of the identified power spectral densities are combined in a piecewise fashion to generate a composite power spectral density. The composite power spectral density is then used to perform the multi-disturber alien crosstalk limited signal-to-noise ratio test.

In some embodiments, combining at least two of the identified power spectral densities in a piecewise fashion to generate the composite power spectral density may comprise forming the composite power spectral density by setting a power level at each frequency in the composite power spectral density as the highest power level at the frequency from amongst the power spectral densities associated with each determined line rate.

In some embodiments, combining at least two of the identified power spectral densities in a piecewise fashion to generate the composite power spectral density further may comprise reducing the set power level at each frequency in the composite power spectral density by the amount of any power back-off that would apply for the disturber link segment operating at the line rate associated with the one of identified power spectral densities that was used to set the power level at the frequency in the composite power spectral density.

In some embodiments, a different composite power spectral density may be used for each of the plurality of disturber link segments that takes into account the power back-offs at which each disturber link segment would operate.

Pursuant to yet additional embodiments of the present invention, methods of performing a multi-disturber alien crosstalk limited signal-to-noise ratio test are provided in which a worst case composite power spectral density is determined for each of a plurality of disturber link segments that couple alien crosstalk onto a victim link segment. The signal-to-alien crosstalk noise ratio is determined for the victim link segment using the worst case composite power spectral densities for each disturber link segment. Each worst case composite power spectral density comprises a combination of portions of a plurality of power spectral densities that are associated with line rates at which the disturber link segments may operate. Each worst case composite power spectral density is a power spectral density that is formed by specifying the power in the worst case composite spectral density at each frequency as the highest signal power at each frequency from amongst the power levels at each frequency in the plurality of power spectral densities, taking into account any power back-off at which the disturber link segment would operate when transmitting at the different associated line rates.

In some embodiments, the power back-offs may be taken into account by adjusting the plurality of power spectral densities for each disturber link segment to reflect the power back-off that would apply when the disturber link segment operates at the line rate associated with each of the plurality of power spectral densities.

DETAILED DESCRIPTION

There is a large base of installed Category 5E and Category 6 cabling and connectors that are designed to support 1000Base-T communications. There currently is an interest in using this installed base of cabling and connectors to support higher data rate communications, specifically 2.5GBase-T and 5GBase-T communications which operate at data rates of 2.5 Gbps and 5 Gbps, respectively. In order to support these higher data rates, each channel (link segment) must meet certain minimum performance levels. The performance criteria that must be met include, among other things, internal crosstalk performance and alien crosstalk performance criteria. Any particular link segment in an already-installed communication system will only be rated for carrying 2.5GBase-T or 5GBase-T communications if internal and alien crosstalk levels for the link segment are below specified thresholds.

In order to identify the link segments in an already-installed communications system that can support the higher data rates associated with 2.5GBase-T or 5GBase-T communications, it is necessary to test each individual link segment. For determining if the alien crosstalk for a particular link segment is low enough so that the link segment can support 2.5GBase-T or 5GBase-T communications, a test known as a Multi-Disturber Alien Crosstalk Limited Signal-to-Noise Ratio test is performed. This test is used to determine the worst case alien crosstalk that might be coupled to the link segment at issue (the "victim" link segment). Pursuant to this test, the link segments (the "disturber" link segments) that may couple alien crosstalk onto the victim link segment are first identified. Then, the victim link segment is analyzed for each different combination of data rate signals (i.e., 1 Gbps, 2.5 Gbps, 5 Gbps and 10 Gbps) that may be transmitted over the disturber link segments, since each different data rate transmission has a different power spectral density, and hence different alien crosstalk coupling characteristics, in order to determine if the victim link segment can support the higher data rate regardless of the types of communications carried on the disturber link segments.

Unfortunately, the proposed Multi-Disturber Alien Crosstalk Limited Signal-to-Noise Ratio test is extremely computation-intensive, and it is expected that the length of time required to perform the necessary computations will make it difficult to qualify installed communications systems to operate using the higher data rate communications. The complexity of the currently proposed test arises because a typical victim link segment will have somewhere between two and six disturber link segments that impart significant crosstalk onto the victim link segment (although it should be noted that less than two and more than six are possible). A total of six disturber link segments is a common situation, as Category 5E, 6 and 6A cables are all sized so that when bundled tightly together each cable within the interior of the bundle will typically be surrounded by six other cables.

Since the goal is to have any Category 5E and Category 6 link segments in an installed communications system that will support higher data rates operate at such higher data rates, each disturber link segment could potentially be transmitting at data rates of 1 Gbps, 2.5 Gbps, 5 Gbps or 10 Gbps (which are also referred to as "line rates" herein) depending upon the results of the qualification test for each specific disturber link segment. Assuming that a victim link segment has six disturber link segments, this means that there are a total of $4^6=4096$ different combinations of line rates running on the six disturber link segments. For a victim link segment that has six disturber link segments, the proposed standard specifies that the signal-to-noise ratio should be calculated for all 4096 different combinations in order to determine if the victim link segment can meet a threshold minimum signal-to-noise ratio with respect to alien crosstalk noise.

Pursuant to embodiments of the present invention, methods of evaluating alien limited signal-to-noise ratio performance of a link segment are provided that require far fewer computations, and hence can be performed in a much shorter time period. For example, in the above test that would require performing a set of calculations 4096 times, using the techniques according to embodiments of the present invention the test could be completed with a single set of calculations. As such, the techniques according to embodiments of the present invention may greatly reduce the amount of time required to perform a Multi-Disturber Alien Crosstalk Limited Signal-to-Noise Ratio test.

As will be discussed in greater detail herein, according to embodiments of the present invention, a so-called "worst case" composite power spectral density is used that may, for example, represent the worst case amount of power at each frequency that could be present on a disturber link segment, regardless of which of a plurality of pre-specified line rates are used for transmission over the disturber link segment. Since such a worst case power spectral density is used, it is no longer necessary to analyze the victim link segment for all of the possible combinations of line rates on the disturber link segments. It should be noted, however, that the "worst case" composite power spectral density will actually overstate the worst case alien crosstalk noise as it combines the worst portions of each of the power spectral densities for the specified line rates. Consequently, the alien crosstalk performance evaluation techniques according to embodiments of the present invention may be pessimistic. It is estimated that the evaluation techniques disclosed herein will typically provide alien crosstalk signal-to-ratios that over-estimate the actual amount of alien crosstalk noise that would arise given the worst case of line rates on the disturber link segments by about 1-2 dB. Since the worst case composite power spectral density may be designed so that it always overstates the actual worst case amount of alien crosstalk, any victim link segment that passes the Multi-Disturber Alien Crosstalk Limited Signal-to-Noise Ratio tests according to embodiments of the present invention may be guaranteed to meet a minimum level of alien crosstalk performance.

The methods of evaluating alien limited signal-to-noise ratio performance of a victim link segment according to embodiments of the present invention will be discussed in greater detail below. However, before discussing these techniques, it is helpful to explain the conventional Multi-Disturber Alien Crosstalk Limited Signal-to-Noise Ratio test that has been proposed, which helps highlight various of the advantages of the techniques according to embodiments of the present invention. The conventional methodology will now be described with reference to FIGS. 2 and 3, while the techniques according to embodiments of the present invention will be described with reference to FIGS. 4A-B and 5.

Figure 2:
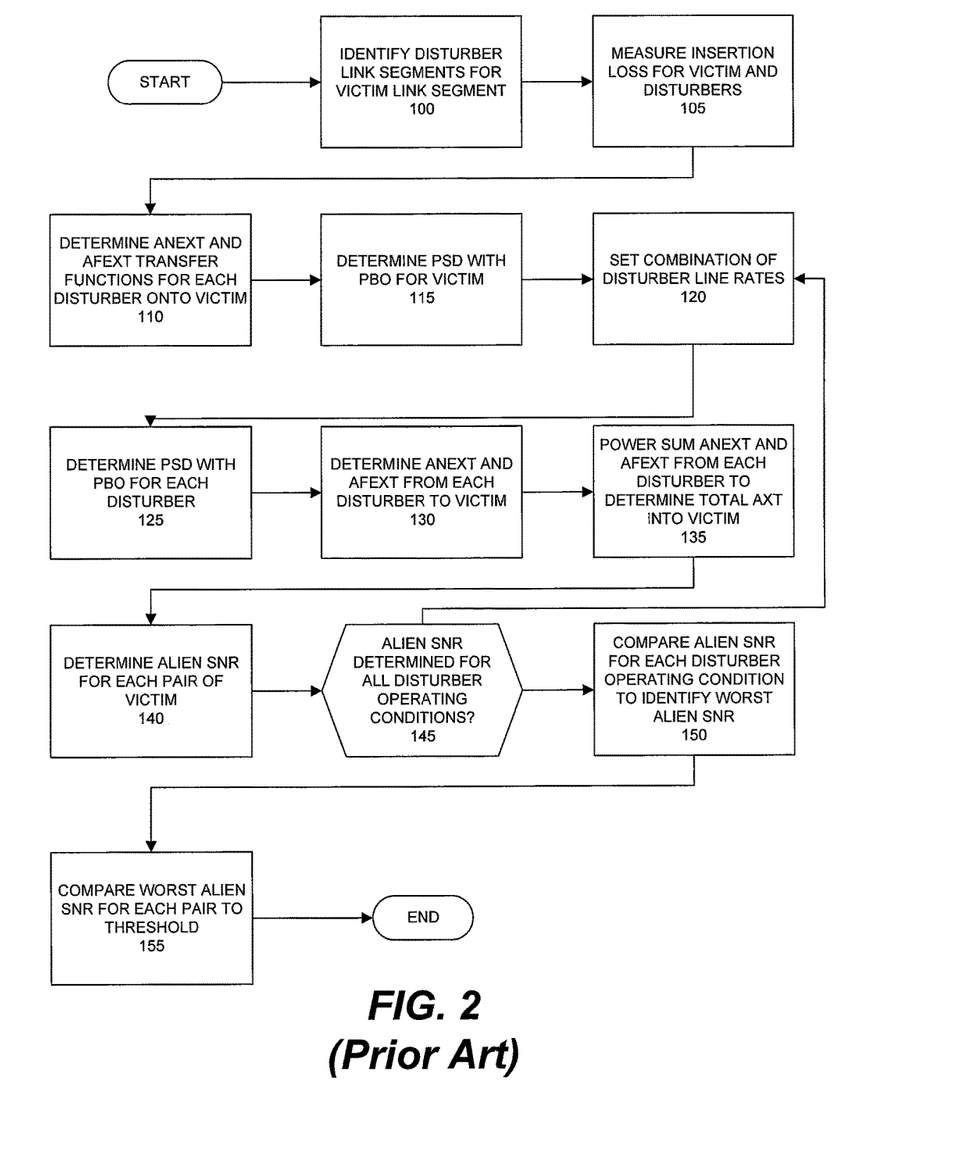
FIG. 2 is a flow chart illustrating a conventional method of performing a Multi-Disturber Alien Crosstalk Limited Signal-to-Noise Ratio test.

FIG. 2 is a flow chart that shows a conventional methodology for performing a Multi-Disturber Alien Crosstalk Limited Signal-to-Noise Ratio test. As is shown in FIG. 2, at operation 100, the disturber link segments for each victim link segment may be identified. Note that in the figures references to the disturber link segment are sometimes shortened to "disturber" and that similarly references to the victim link segment are sometimes shortened to "victim." Here, a link segment will typically refer to all of the cables and connectors that are interposed in a communications path between a connector port on a network switch and a connector port on an end device. In the simple example described above with reference to FIG. 1, the illustrated link segment 16 extends from the plug 34 on patch cord 30 that is inserted into computer 20 to the plug 72 on patch cord 70 that is inserted into the connector port 82 on the network switch 80. Thus, assuming that the alien crosstalk test is being performed on link segment 16, then here the victim link segment 16 would comprise patch cord 30, RJ-45 jack 40, horizontal cable 50, connector port 62 on patch panel 60 and patch cord 70 that connects connector port 62 to a connector port 82 on the network switch 80. It will be appreciated that FIG. 1 only fully illustrates a single link segment 16 in the communication system 10. However, as can be seen in FIG. 1, a large number of horizontal cables 50 are terminated into the connector ports 62 of the patch panels 60, and each of these horizontal cables 50 will typically be connected to other end devices (not shown) in other offices via additional wall jacks 40 and patch cords 30. Additional patch cords 70 would also be provided between the patch panel connector ports 62 and the network switch connector ports 82, which, combined with the other patch cords 30 and jacks 40, implement a plurality of additional link segments 16.

Referring again to block 100 of FIG. 2, a "disturber link segment" refers to a link segment that has the potential to couple more than a de minimis amount of alien crosstalk onto the victim link segment. Techniques are known in the art for determining in an installed communications system the link segments that are considered to be "disturber" link segments for any given victim link segment, and hence those techniques will not be repeated here. Typically, in an installed communications system, each victim link segment will have between two and six disturber link segments, although more or fewer disturber link segments are possible, depending upon the actual placement of the cables in the cable bundles and the types and relative locations of the connector hardware.

As shown in FIG. 2, in the next step the insertion loss of the victim link segment and each disturber link segment is measured (block 105). As known to those of skill in the art, insertion loss is a measure of the power that is lost due to the insertion of an element along a transmission line between a source and a load. Thus, the insertion loss for the link segment 16 of FIG. 1 is a measure of the power lost along the components of the link segment 16 (i.e., patch cord 30, jack 40, horizontal cable 50, connector port 62 and patch cord 70) as a signal is transmitted from the connector port 82 on network switch 80 to the computer 20. Insertion loss is typically expressed as a ratio in decibels (dB) as follows:

$$IL(dB)=10 \log_{10}(P_T/P_R) \qquad (1)$$

where IL(dB) is the insertion loss in dB, $P_T$ is the amount of power transmitted that would be transmitted to a load if the link segment was not interposed between the source and the load, and $P_R$ is the power received by the load (for a signal having the same power transmitted from the source) after the insertion of the link segment between the source and the load. Low insertion loss values are desirable.

The insertion loss for each link segment may be measured, for example, using commercially available handheld test equipment that is known to those of skill in the art. Typically, a number of additional parameters will be measured for each link segment at this time, including, for example, internal crosstalk parameters (i.e., the crosstalk between the four differential pairs of the cables and connectors that make up the link segment), as the link segment must meet a variety of different electrical performance parameters for the transceivers to operate at higher data rates. However, since embodiments of the present invention are directed to a methodology for determining a specific one of these performance parameters, namely the Multi-Disturber Alien Crosstalk Limited Signal-to-Noise Ratio test, further description of these other parameter measurements will be omitted here.

It will be appreciated that in order to perform the Multi-Disturber Alien Crosstalk Limited Signal-to-Noise Ratio test on any particular "victim" link segment, it is only necessary that the insertion loss be measured for the victim link segment and for each link segment that is a "disturber" link segment for the victim link segment at issue. Accordingly, block 105 only discusses measuring the insertion loss for the victim link segment and each disturber link segment for the victim link segment. It will, however, be appreciated that typically the insertion loss for all of the link segments in the communications system would be measured as part of the operations at block 105 of FIG. 2, as typically Multi-Disturber Alien Crosstalk Limited Signal-to-Noise Ratio tests are performed for all of the link segments in order to qualify the communications system for operation at higher data rates.

Next, the test equipment may be used to measure the alien crosstalk transfer functions from each disturber link segment to the victim link segment (block 110). In this step, test signals are transmitted over each differential pair of each disturber link segment and the signal energy that couples to each differential pair of the victim link segment is measured as a function of frequency. Both ANEXT and AFEXT measurements are performed, so for each disturber link segment, a total of thirty-two measurements are performed, namely the amount of ANEXT coupled from each of the four differential pairs of a disturber link segment to each of the four differential pairs of the victim link segment, and the amount of AFEXT coupled from each of the four differential pairs of the disturber link segment to each of the four differential pairs of the victim link segment. Assuming six disturber link segments, a total of 192 alien crosstalk measurements are made for each victim link segment. The measurement results are referred to as "transfer functions" as they show the alien crosstalk coupling characteristics from each differential pair of a disturber link segment to each differential pair of the victim link segment as a function of frequency.

It should be noted that in performing the operations of FIG. 2 it is assumed that the line rate of the victim link segment is set at a specific value. For purposes of this example, it will be assumed that the victim link segment is operating at a line rate of 2.5 Gbps. Based on the insertion loss value that is measured in the operations of block 105 for the victim link segment and the assumed line rate of 2.5 Gbps, the power back-off (also referred to herein as "PBO") for the victim link segment may be determined. The power back-off refers to an amount that the transmission power of a transceiver that is transmitting on a particular link segment must be reduced during operation of the communications system. Power back-offs are used because the lengths of the link segments, and hence the insertion losses thereof, may vary greatly, with some link segments being as long as, for example, 100 meters, while other link segments may be much shorter (e.g., 10 meters or less). The shorter link segments may have significantly reduced insertion losses (e.g., 3-6 dB less), and hence acceptable signal-to-noise ratios may be obtained on these shorter link segments even if the transceivers operate at lower transmit power levels (i.e., at a power back-off). By reducing the transmit power levels on these shorter link segments, the amount of alien crosstalk that these shorter link segments will couple onto other "victim" link segments may be reduced. The power back-off for the victim link segment may be determined, for example, by reference to a look-up table that specifies the amount of power back-off as a function of the measured insertion loss for the link segment and the line rate of the link segment.

As part of the operations of block 115, the power spectral density ("PSD") with power back-off for the victim link segment is also determined. The power spectral density for the victim link segment may be obtained from, for example, a look-up table, based on the line rate of the victim link segment, and then may be adjusted to take into account the determined power back-off for the link segment.

Figure 3:
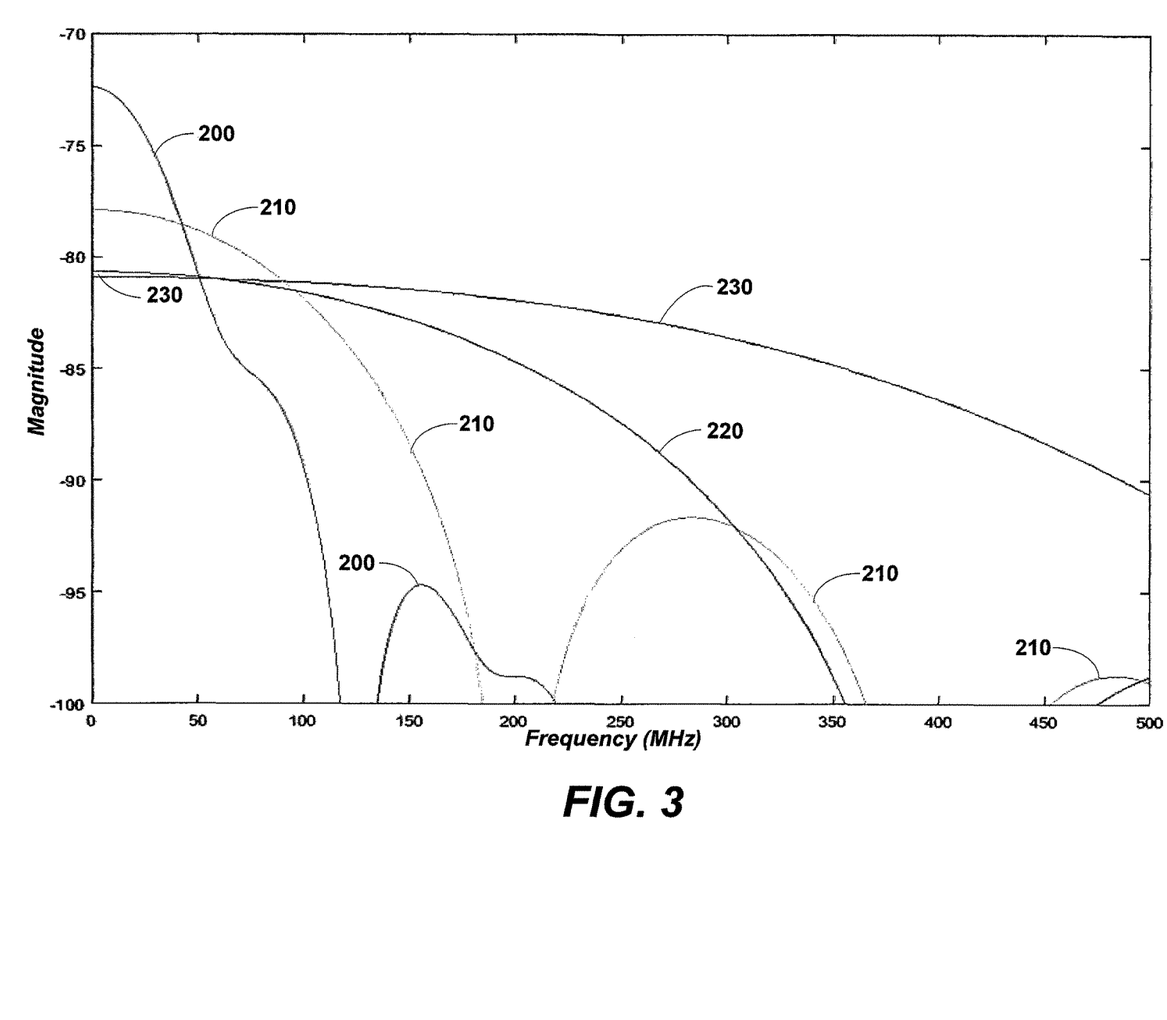
FIG. 3 is a graph illustrating the power spectral densities (without power back-off) for 1 Gbps, 2.5 Gbps, 5 Gbps and 10 Gbps line rates.

As noted above, in the present example, the victim link segment may potentially operate at one of four different line rates, namely line rates of 1 Gbps, 2.5 Gbps, 5 Gbps and 10 Gbps. Signals that are transmitted over the victim link segment will have one of four different power spectral densities depending upon the line rate at which the victim link segment operates. FIG. 3 is a graph illustrating the power spectral densities for signals that are transmitted over the victim link segment (or over a disturber link segment) at line rates of 1 Gbps, 2.5 Gbps, 5 Gbps and 10 Gbps, respectively. In particular, in FIG. 3, curve 200 is the power spectral density for a 1 Gbps line rate signal transmission, curve 210 is the power spectral density for a 2.5 Gbps line rate signal transmission, curve 220 is the power spectral density for a 5 Gbps line rate signal transmission, and curve 230 is the power spectral density for a 10 Gbps line rate signal transmission.

In the operations of block 115 of FIG. 2, the appropriate power spectral density is selected based on the assumed line rate for the victim link segment, which in the present example would be curve 210 as the victim link segment is assumed to be operating at a line rate of 2.5 Gbps. Curve 210 is then adjusted for any power back-off that the victim link segment will be operating under given the measured insertion loss on the victim link segment. For example, if the victim link segment will be operating under a power back-off of 3 dB, then the power at all points on curve 210 of FIG. 3 would be reduced by 3 dB to generate the power spectral density with power back-off for the victim link segment.

As discussed above, each disturber link segment may be operating at one of a plurality of different line rates, depending upon the line rate that each disturber link segment is ultimately determined to support. In the present example, it is assumed that there are a total of six disturber link segments for the victim link segment, and that each disturber link segment will be operating at one of four line rates, namely 1 Gbps, 2.5 Gbps. 5 Gbps or 10 Gbps. The specific combination of line rates that the six disturber link segments are assumed to be operating at will be referred to herein as the Disturber Operating Conditions. In the present example where there six disturbers and four possible line rates, there are a total of 4096 different Disturber Operating Conditions (i.e., $4^6$=4096). At block 120, a first Disturber Operating Condition is selected. For purposes of this example, it will be assumed that this first Disturber Operating Condition is the case where all six disturber link segments are operating at a line rate of 1 Gbps.

At block 125, the power spectral density with power back-off is determined for each of the disturber link segments. This may be done in the same manner as the power spectral density with power back-off is determined for the victim link segment in block 115 above. In determining the power spectral density with power back-off, the selected Disturber Operating Conditions sets the line rate for each disturber link segment. The power spectral density for each disturber link segment is determined based on the line rate of the disturber link segment. The power back-off for each of the six disturber link segments is determined based on the measured insertion loss values and the power back-off s for the set line rate for each disturber link segment, and the power spectral density for each of the six disturber link segments is adjusted to account for the power back-offs.

At block 130 of FIG. 2, the ANEXT and AFEXT transfer functions that were determined (by physical measurement) at block 110 of FIG. 2 are combined with the power spectral densities for each disturber link segment, with power back-off, as determined at block 125 of FIG. 2, to determine the actual amount of ANEXT and AFEXT that will couple from each differential pair of each disturber link segment onto each differential pair of the victim link segment for the specific Disturber Operating Conditions being analyzed (which here is all six disturber link segments transmitting at line rates of 1 Gbps). This can be determined mathematically, and will be a function of frequency since both the power spectral density with power back-off for the signals transmitted on each disturber link segment and the ANEXT and AFEXT transfer functions vary with frequency. If the power spectral densities, power back-offs and ANEXT and AFEXT transfer functions are all specified in decibels, the alien crosstalk noise contribution of each disturber link segment onto each differential pair of the victim link segment may be determined by, at each frequency, subtracting the power back-off and the power levels of the ANEXT and AFEXT transfer functions from the power spectral density for the disturber link segment. For each disturber link segment, the result of this step will be sixteen ANEXT values and sixteen AFEXT values which represent the amount of ANEXT and AFEXT which will couple from the four differential pairs of the disturber link segment onto the four differential pairs of the victim link segment. These values are referred to herein as the "individual received alien crosstalk noise components." This step is performed for each of the six disturber link segments.

Still referring to FIG. 2, at block 135 the individual received alien crosstalk noise components that were determined at block 130 of FIG. 2 are power-summed to determine the total amount of alien crosstalk noise that will couple to each differential pair of the victim link segment when the disturber link segments are transmitting under the Disturber Operating Conditions that are currently under evaluation. As discussed above, the individual received alien crosstalk noise components comprise a total of sixteen ANEXT and sixteen AFEXT transfer functions, at each frequency, for each of the six disturber link segments. In the operations of block 135, a power sum calculation is performed at each frequency to sum the amount of ANEXT and AFEXT that will couple into each differential pair of the victim link segment. As is known to those of skill in the art, a power sum calculation may be performed as follows:

$$10*\text{squareroot}(Power1+Power2+\ldots+PowerN) \quad (2)$$

where each of Power1, Power2, . . . PowerN is specified in Watts. If the power values are provided in dB (voltage), then each of Power1, Power2, . . . PowerN may be determined as:

$$PowerX=10\textasciicircum(\text{Power(in dB)}/10) \quad (3)$$

For the first disturber link segment, the power sum calculation will power sum, at each frequency, the four individual ANEXT values that specify the amount of ANEXT that couples from the four differential pairs of the first disturber link segment onto a first of the four differential pairs of the victim link segment and the four individual AFEXT values that specify the amount of AFEXT that couples from the four differential pairs of the first disturber link segment onto a first of the four differential pairs of the victim link segment. Similar power sum calculations are then performed for the remaining three differential pairs of the victim link segment. As a result, four graphs of power versus frequency are provided that represent the amount of alien crosstalk power that couples from the first disturber link segment to the respective differential pairs of the victim link segment. The same calculations are then performed for the second through sixth disturber link segments.

The results of the above-described calculations for the six disturber link segments are then power summed, at each frequency, to determine the total amount of alien crosstalk noise ("AXT") that will couple from the six disturber link segments onto each of the four differential pairs of the victim link segment. This power sum simply sums six values, namely the power coupled from each of the six disturbers onto a given differential pair of the victim link segment, at each frequency. The result of this step is four graphs of power versus frequency that represent the total amount of alien crosstalk power that couples from all six disturber link segments combined onto the four respective differential pairs of the victim link segment.

Next, at block 140, the signal-to-noise ratio ("SNR") is determined for each differential pair of the victim link segment, where the "noise" refers to the alien crosstalk noise. The alien crosstalk noise that will couple onto each differential pair of the victim link segment is known, as a function of frequency, from the operation at block 135 of FIG. 2. The signal power of the victim link segment is known from the operations of block 115 of FIG. 2. A single power term is then computed for both the signal power and the noise power across the frequency band of interest for each differential pair of the victim line segment given the selected line rate for the victim line segment. The single signal power term may be computed, foe example, by averaging the signal power over the frequency band of interest and the single noise power term may be computed, foe example, by averaging the alien crosstalk noise power over the frequency band of interest. The signal-to-noise ratio (for alien crosstalk noise) is then determined for each differential pair of the victim link segment by dividing the signal power term by the noise power term.

As discussed above, the operations of blocks 120 through 140 were performed for a first Disturber Operating Condition where it was assumed that all six disturber link segments were transmitting at 1 Gbps. As also noted above, in the case where there are six disturber link segments and four possible line rates, there are a total of 4096 different Disturber Operating Conditions. Accordingly, at block 145 of FIG. 2 a determination is made as to whether or not the alien crosstalk signal-to-noise ratio has been determined for all 4096 Disturber Operating Conditions. If they have not, operations return to block 120 where another Disturber Operating Condition for which the alien crosstalk signal-to-noise ratio has not yet been determined is selected, and then the operations of blocks 125 through 145 are repeated for the next set of Disturber Operating Conditions. Once at block 145 it is determined that the calculations have been performed for all 4096 Disturber Operating Conditions, operations may then move to block 150.

At block 150 of FIG. 2, the determined signal-to-noise ratios for each differential pair of the victim line segment (there are 4096 of these for each of the four differential pairs of the victim line segment) are compared to identify for each differential pair the lowest (minimum) signal-to-noise ratio. Then, at block 155, these four worst-case signal-to-noise ratio values or an average across the four differential pairs are compared to predefined thresholds to determine if there is sufficient signal-to-noise ratio that is above this predefined minimum value. If so, the victim line segment may operate at the line rate which was assumed for the victim line segment in the above-described methodology. The above-described methodology may then be repeated, if desired, assuming that the victim line segment is operating at one of the other line rates (e.g., 5 Gbps) to determine if the victim line segment may operate at those other line rates.

As is readily apparent from the above description, the current methodology is extremely computation intensive. The above-described methodology would be performed on each link segment of a communications system. In a small office environment, it would be expected that at least hundreds of link segments would be present. In larger office environments, thousands or tens of thousands of link segments might be more typical. In data center environments, hundreds of thousands of link segments (or more) may be present. Thus, the amount of computation that is required to perform the Multi-Disturber Alien Crosstalk Limited Signal-to-Noise Ratio test on an entire communications system may be too large to realistically perform in the field (as this test necessarily is done in practice), as the computations would typically be performed on laptop computers. In fact, it has been estimated that the calculations required for a single link segment using the conventional methodology of FIG. 2 may take over an hour if performed using ordinarily available computational platforms.

Pursuant to embodiments of the present invention, methods of performing Multi-Disturber Alien Crosstalk Limited Signal-to-Noise Ratio tests are provided that may be far less computation intensive as compared to the above-described conventional methodology. Pursuant to these methods, instead of performing a computation for each disturber operating at each different line rate (which in the above example necessitated 4096 calculations), a single computation may be performed. This may reduce the number of computations by a factor of 4096. Consequently, assuming that the conventional approach takes 1 hour (3600 seconds) to perform for each victim link segment, under the new methodology the amount of time required would be less than one second.

The above-described savings in computation time may be achieved by defining a "worst case" composite power spectral density that is used in place of the four power spectral densities that are shown in FIG. 3 for the four line rates. The worst case composite power spectral density may be determined, for example, by combining the four power spectral densities of FIG. 3 in a piecewise fashion to form a composite power spectral density that, for each frequency range, uses the one of the four power spectral densities of FIG. 3 that has the highest power (i.e., which is the worst case). By defining such a worst case composite power spectral density, the need to calculate all 4096 different combinations of disturber line rates may be eliminated. It is estimated that when the worst case composite power spectral density approach is used, the signal-to-noise ratios will be between 1-2 dB worse than the actual worst case of the 4096 different combinations of line rates. This is sufficiently close to the actual results that the signal-to-noise ratios calculated according to the techniques of the present invention may readily be used to determine if a particular link segment of an already-installed communications system can be operated at higher line rates. Moreover, as the signal-to-noise ratio values determined using the methods described herein are worse than the actual values (by 1-2 dB), a link segment that is determined to have a sufficient signal-to-noise ratio using the current techniques should be guaranteed to actually have a sufficient signal-to-noise ratio, and likely has about 1-2 dB of additional margin.

Figure 4A:
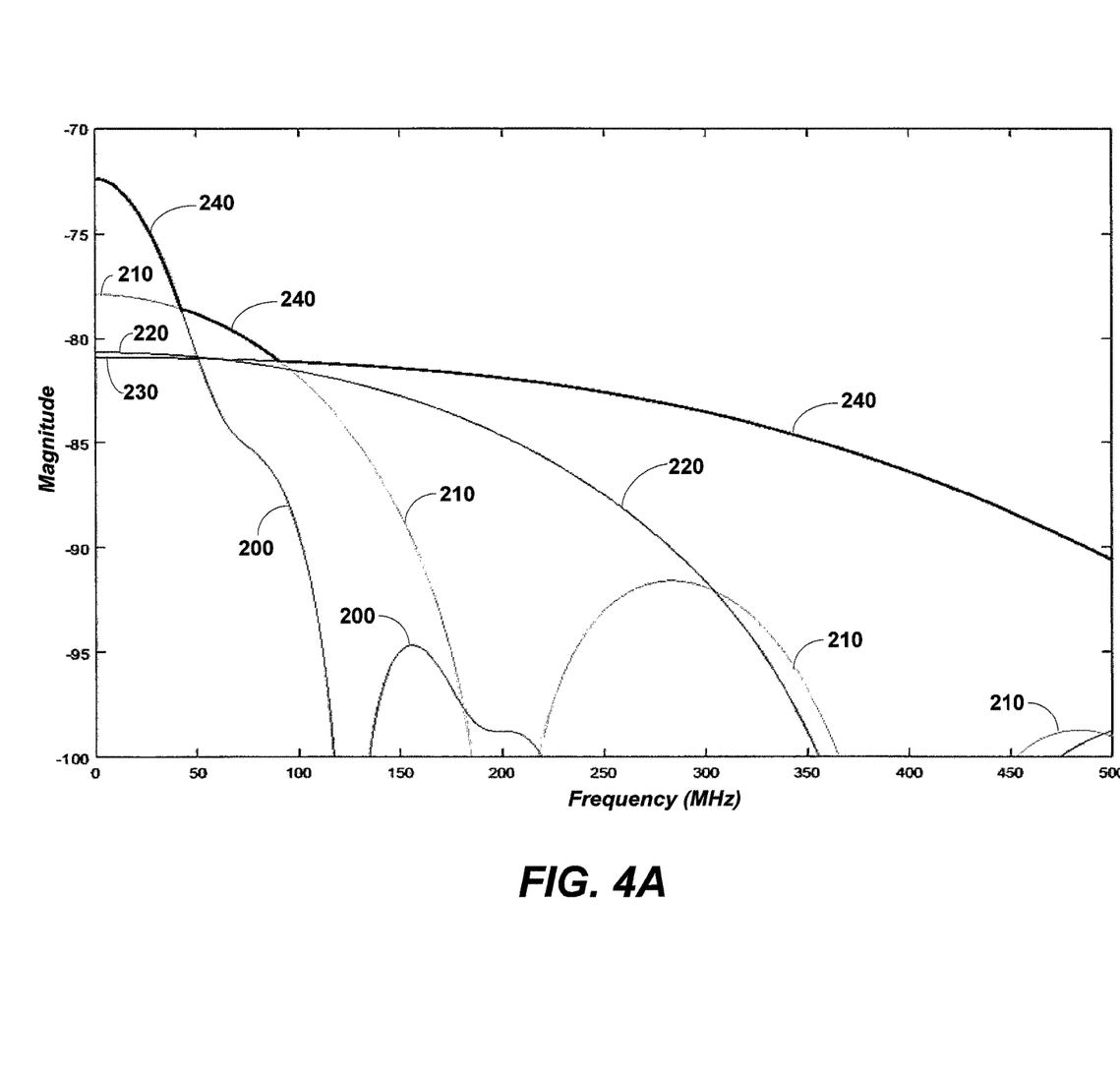
FIG. 4A is a graph illustrating an example worst case composite power spectral density that may be used in performing a Multi-Disturber Alien Crosstalk Limited Signal-to-Noise Ratio test according to embodiments of the present invention.

FIG. 4A is a graph of a worst case composite power spectral density that may be used in the methods according to embodiments of the present invention. Referring to FIG. 4A, the power spectral densities 200, 210, 220, 230 for 1 Gbps, 2.5 Gbps, 5 Gbps and 10 Gbps line rates are shown that were discussed above with reference to FIG. 3. In addition, a worst case composite power spectral density 240 is defined. As shown in FIG. 4A, in this embodiment, the worst case composite power spectral density 240 comprises a piecewise function that is formed by creating a power spectral density by using the one of the four power spectral densities 200, 210, 220, 230 that has the highest power at each frequency as to form the worst case composite power spectral density 240. This worst case composite power spectral density 240 thus represents a worst case power spectral density for any given disturber link segment as it assumes for each frequency that the disturber link segment has the worst possible (i.e., highest) power amongst the four line rates.

As the worst case composite power spectral density 240 combines the power spectral densities 200, 210, 220, 230 for the four different line rates, only a single power spectral density is now associated with each disturber link segment. Consequently, instead of having to perform $4^6=4096$ different calculations, using the methods according to embodiments of the present invention, a total of $1^6=1$ calculation is required. Thus, the methods according to embodiments of the present invention provide a tremendous reduction in the amount of calculations that are required.

Figure 4B:
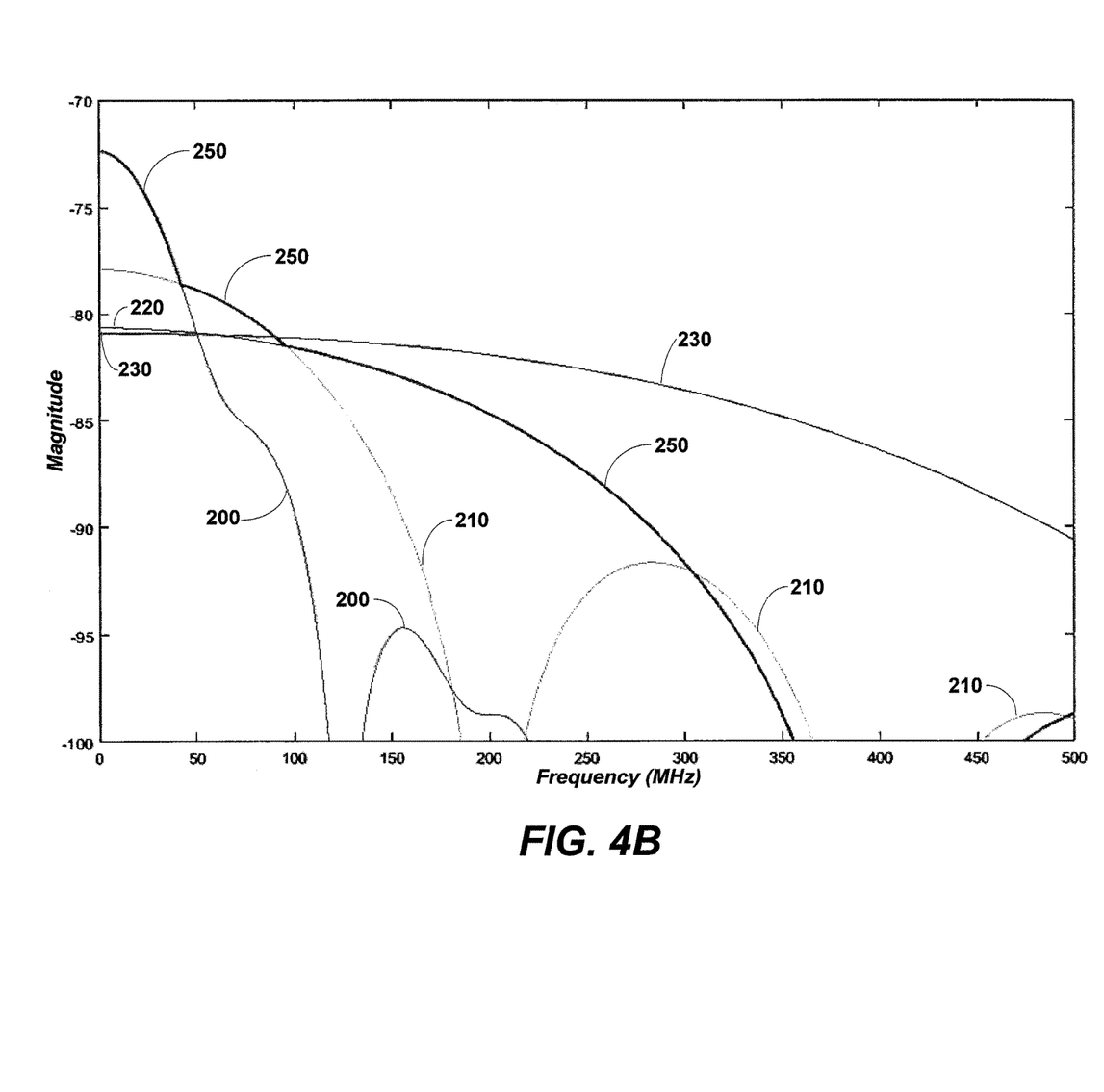
FIG. 4B is a graph illustrating another example worst case composite power spectral density that may be used in performing a Multi-Disturber Alien Crosstalk Limited Signal-to-Noise Ratio test according to embodiments of the present invention.

FIG. 4B is a graph of another worst case composite power spectral density 250 that may be used in the methods according to embodiments of the present invention. In some cases, it may be that it is known in advance that none of the link segments in a communications system will operate at 10 Gbps. This may be because transceivers that can support such transmission rates will not be deployed, because it is known or believed that most of the link segments will not support 10 Gbps due to the quality of the installed cabling and connectors and/or due to amount of alien crosstalk expected. As shown in FIG. 4B, in this case a worst case composite power spectral density 250 may be provided that is formed by using the one of the three power spectral densities 200, 210, 220 (i.e., the power spectral densities for 1 Gbps, 2.5 Gbps and 5 Gbps) that has the highest power at each frequency as to form the worst case composite power spectral density 250.

While FIGS. 4A and 4B illustrate two different possible worst case composite power spectral densities 240, 250, it will be appreciated that other worst case composite power spectral densities may be used. For example, the power back-off rules may differ for different line rates. As a result, adjustments may be made to the worst case composite power spectral densities to account for these differences. It will also be appreciated that modeling could be used to provide worst case composite power spectral densities that may more accurately estimate actual performance. It will be appreciated, however, that such worst case composite power spectral densities may not necessarily guarantee that the actual performance will be at least as good as the computed performance.

Figure 5:
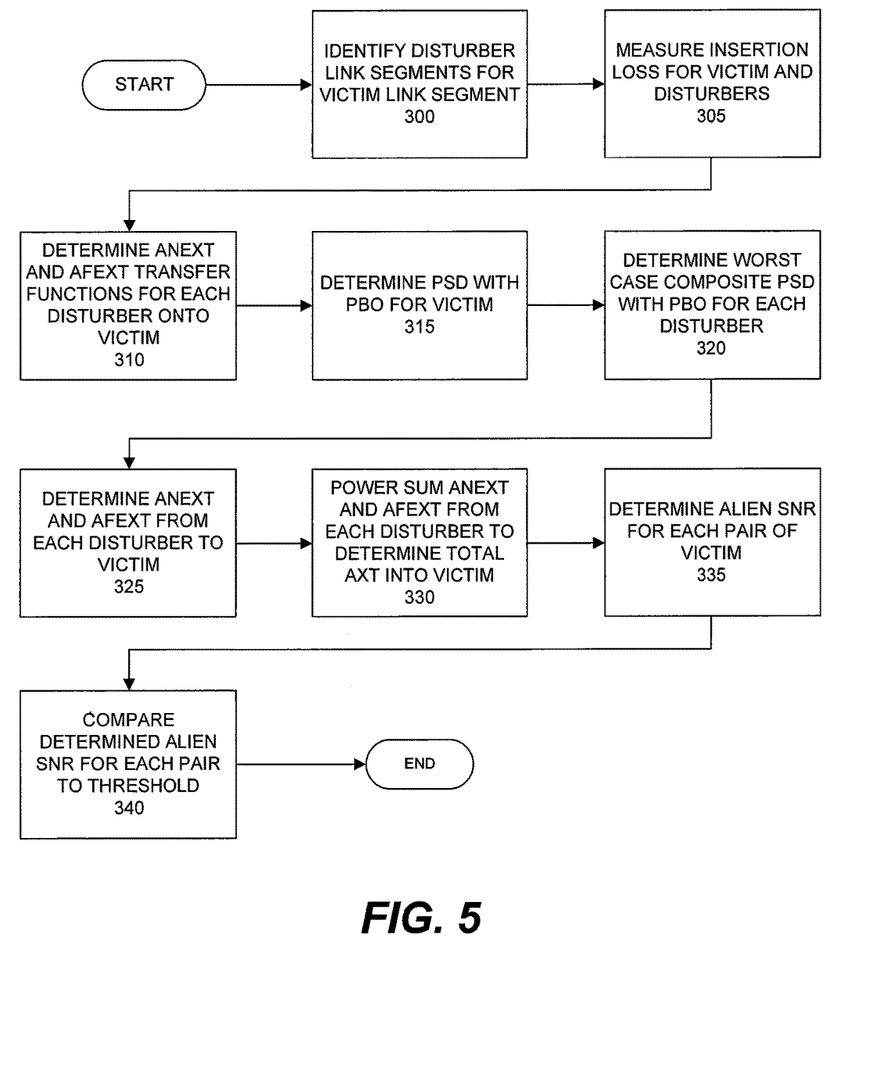
FIG. 5 is a flow chart illustrating a method of performing a Multi-Disturber Alien Crosstalk Limited Signal-to-Noise Ratio test according to embodiments of the present invention.

FIG. 5 is a flow chart that shows a methodology for performing a Multi-Disturber Alien Crosstalk Limited Signal-to-Noise Ratio test according to embodiments of the present invention. As shown in FIG. 5, at block 300 the disturber link segments for each victim link segment are next determined. The disturber link segments for the victim link segment may be determined in the same manner as is done in the conventional methodology that is described above with reference to block 100 of FIG. 2. Accordingly, further discussion of this step in the methodology will be omitted. Next, the insertion loss characteristic of the victim link segment and each disturber link segment in an installation is determined (block 305). The insertion loss for these link segments may be obtained by performing measurements in the same manner as is done in the conventional methodology that is described above with reference to block 105 of FIG. 2. Accordingly, further discussion of these measurements will be omitted. At operation 310 of FIG. 5, the test equipment may be used to measure the alien crosstalk transfer functions from each disturber link segment to the victim link segment. The alien crosstalk transfer functions may be determined in the same manner as is done in the conventional methodology that is described above with reference to block 110 of FIG. 2. Accordingly, further discussion of this step in the methodology will also be omitted.

Still referring to FIG. 5, at block 315, it is assumed that the victim link segment will be operating at one of the four specified line rates discussed above. In the present example, it will be assumed that the victim line rate is 2.5 Gbps. Based on the insertion loss value that is measured in operation 305 for the victim link segment, the power back-off for the victim link segment may be determined. The power back-off for the victim link segment may be determined by reference to a look up table that specifies the amount of power back-off as a function of the measured insertion loss for the victim link segment and the line rate of the victim link segment. As part of operation 315, the power spectral density ("PSD") with power back-off ("PBO") for the victim link segment is also determined. The power spectral density for the victim link segment may be obtained from, for example, a look-up table, based on the line rate of the victim link segment and by then adjusting the power spectral density for the particular line rate to take into account the determined power back-off for the link segment.

At block 320, the power back-offs are determined for each of the disturber link segments, and these power back-offs are then applied to the worst case composite power spectral density that is discussed above. The power back-offs for each disturber link segment are determined based on the insertion loss of each disturber link segment. The worst case composite power spectral density for each disturber link segment is modified to reflect the power back-off that would be applied for each of the four possible line rates. For example, with reference to FIG. 4A, if a power back-off of 2 dB would apply if a first of the disturber link segments is operating at a line rate of 2.5 Gbps, then the portion of the worst case composite power spectral density for the first of the disturber link segments that extends between about 50 MHz to about 100 MHz—which is the portion of the worst case composite power spectral density that is based on the 2.5 Gbps line rate—would be reduced by 2 dB to reflect this power back-off. The remaining piecewise segments of the worst case composite power spectral density for the first of the disturber link segments would likewise be adjusted to reflect the power back-off, if any, that would apply at the other possible line rates (note that in this example a power back-off that applies at the 10 Gbps line rate would not impact the worst case composite power spectral density as no part of the worst case composite power spectral density is based on the power spectral density for the 10 Gbps line rate). In this fashion, a worst case composite power spectral density is generated for each disturber link segment in the operations of block 320. As each disturber link segment may have different insertion losses, the worst case composite power spectral density with power back-off may be different for each disturber link segment.

Still referring to FIG. 5, at block 325 the ANEXT and AFEXT transfer functions that were determined via the operations of block 310 are combined with the worst case composite power spectral densities for each disturber link segment, with power back-off, as determined at block 320 of FIG. 5, to determine the "worst case" amount of ANEXT and AFEXT that will couple from each differential pair of each disturber link segment onto each differential pair of the victim link segment. This can be determined mathematically, and will be a function of frequency since both the worst case composite power spectral density with power back-off for each disturber link segment and the ANEXT and AFEXT transfer functions vary with frequency. If the power spectral densities, power back-offs and ANEXT and AFEXT transfer functions are all specified in decibels, the "worst case" alien crosstalk noise contribution of each disturber link segment onto each differential pair of the victim link segment may be determined by, at each frequency, subtracting the power back-off and the powers of the ANEXT and AFEXT transfer functions from the power spectral density for the disturber link segment. For each disturber link segment, the result of this step will be sixteen ANEXT values and sixteen AFEXT values which represent the amount of ANEXT and AFEXT which will couple from the four differential pairs of the disturber link segment onto the four differential pairs of the victim link segment based on the worst case composite power spectral density.

At block 330 of FIG. 5, the individual received alien crosstalk noise components that were determined at block 325 of FIG. 5 are power-summed to determine the total amount of alien crosstalk noise that will couple to each differential pair of the victim link segment when it is assumed that the disturber link segments are transmitting signals having the worst case composite power spectral density. As discussed above, the individual received alien crosstalk noise components comprise a total of sixteen ANEXT and sixteen AFEXT noise functions, at each frequency, for each of the six disturber link segments. In the operations of block 330, a power sum calculation is performed at each frequency to sum the amount of ANEXT and AFEXT that will couple into each differential pair of the victim link segment. As a result, for each disturber link segment, four graphs of power versus frequency are generated that represent the amount of alien crosstalk noise power that couples from the disturber link segment to the respective differential pairs of the victim link segment.

The results of the above-described calculations for the six disturber link segments are then power summed, at each frequency, to determine the total amount of alien crosstalk noise ("AXT") that will couple from the six disturber link segments onto each of the four differential pairs of the victim link segment. This power sum simply sums six values, namely the power coupled from each of the six disturbers onto a given differential pair of the victim link segment, at each frequency. The result of this step is four graphs of power versus frequency that represent the total amount of alien crosstalk power that couples from all six disturber link segments combined onto the four respective differential pairs of the victim link segment. The above-described operations at block 330 of FIG. 5 may be identical to the operations of block 135 of FIG. 2 except that in the operations of block 330 of FIG. 5 the worst case composite power spectral densities with power back-off are used for each disturber link segment.

Next, at block 335, the signal-to-noise ratio is determined for each differential pair of the victim link segment, where the "noise" refers to the alien crosstalk noise. The worst case alien crosstalk noise is known, as a function of frequency, from the operation at block 330 of FIG. 5, and may be converted into an alien crosstalk noise term (e.g., by averaging across frequency). The signal power is known from the operations of block 315 of FIG. 5. A signal power term is then computed (e.g., by averaging across frequency) for both the signal power and the noise power across the frequency band of interest for the victim line segment given the selected line rate for the victim line segment. The signal-to-noise ratio (for alien crosstalk noise) is then determined for each differential pair of the victim link segment by dividing the signal power term by the noise power term.

At block 340 of FIG. 5, the determined signal-to-noise ratios for each differential pair or an average across the differential pairs of the victim line segment are compared to respective predefined thresholds to determine if each differential pair has a signal-to-noise ratio that is above this pre-defined minimum value. If so, the victim line segment may operate at the line rate which was assumed for the victim line segment in the above-described methodology. The above-described methodology may then be repeated, if desired, assuming that the victim line segment is operating at one of the other line rates (e.g., 5 Gbps) to determine if the victim line segment may operate at those other line rates.

It will be appreciated that various changes may be made to the above-discussed methods without departing from the scope of the present invention. For example, the above-described embodiments primarily focus on the case where there are six disturber link segments and where each link segment in the communications system may operate at a line rate of 1 Gbps, 2.5 Gbps, 5 Gbps or 10 Gbps. It will be appreciated, however, that the methods disclosed herein may be used for different numbers of disturber link segments, different numbers of line rates, and line rates that differ from the four specific line rates discussed in the above example embodiments.

The present invention has been described above with reference to the accompanying drawings. The invention is not limited to the illustrated embodiments; rather, these embodiments are intended to fully and completely disclose the invention to those skilled in this art. In the drawings, like numbers refer to like elements throughout.

Well-known functions or constructions may not be described in detail for brevity and/or clarity. As used herein the expression "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes" and/or "including" when used in this specification, specify the presence of stated features, operations, elements, and/or components, but do not preclude the presence or addition of one or more other features, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments of the present invention have been described below with reference to the flowchart of FIG. 5. It will be understood that in other embodiments the ordering of the blocks of this flowchart may be modified so that various operations are performed in a different order than shown in FIG. 5, and/or that in some cases two (or more) of the blocks of the flowchart may be carried out at the same time.

Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A method of performing a multi-disturber alien crosstalk limited signal-to-noise ratio test, the method comprising:
determining at least one signal-to-alien crosstalk noise ratio for a victim link segment using a composite power spectral density for a first of a plurality of disturber link segments,
wherein the composite power spectral density comprises a combination of portions of a plurality of power spectral densities that are associated with different line rates at which the first of the plurality of disturber link segments may operate.

2. The method of claim 1, further comprising determining an alien crosstalk noise contribution for the first of the plurality of disturber link segments using the composite power spectral density for the first of a plurality of disturber link segments, wherein the composite power spectral density accounts for any power back-offs at which the first of the plurality of disturber link segments would operate when transmitting signals at the respective line rates.

3. The method of claim 2, wherein different portions of the composite power spectral density are adjusted different amounts to account for different power back-offs that apply when the first of the plurality of disturber link segments operates at different line rates.

4. The method of claim 1, further comprising determining a signal power of the victim link segment for the signal-to-alien crosstalk noise ratio using one of the plurality of power spectral densities that corresponds to a specific line rate for the victim link segment.

5. The method of claim 1, wherein the at least one signal-to-alien crosstalk noise ratio is determined using respective composite power spectral densities for each of the plurality of disturber link segments.

6. The method of claim 1, wherein the composite power spectral density comprises a worst case composite power spectral density that is formed by assigning, at each of a plurality of frequencies within an operating frequency band of the victim link segment operating at a first line rate, a highest power level from the plurality of power spectral densities that are associated with line rates at which the first of the disturber link segments may operate.

7. A method of determining a supportable data rate on a victim link segment of a communications system, the method comprising:
   determining insertion loss values for the victim link segment;
   identifying a plurality of disturber link segments for the victim link segment; and
   determining an alien crosstalk noise from each differential pair of each disturber link segment to each differential pair of the victim link segment using a respective composite power spectral density for each disturber link segment to quantify the alien crosstalk noise that is coupled to each differential pair of the victim link segment from each differential pair of each of the disturber link segments, wherein each composite power spectral density is a piecewise combination of portions of a plurality of power spectral densities that are associated with different line rates at which the disturber link segments may operate.

8. The method of claim 7, further comprising determining insertion loss values for each of the disturber link segments.

9. The method of claim 8, further comprising determining near end alien crosstalk and far end alien crosstalk transfer functions from each differential pair of each of the disturber link segments to each differential pair of the victim link segment.

10. The method of claim 9, further comprising determining a power spectral density with power back-off for the victim link segment based on a pre-selected line rate for the victim link segment.

11. The method of claim 10, further comprising determining, for each differential pair of the victim link segment, a worst case estimate of a total alien crosstalk noise that couples onto the differential pair of the victim link segment from the differential pairs of each of the plurality of disturber link segments.

12. The method of claim 11, further comprising determining a signal-to-alien crosstalk noise ratio for each differential pair of the victim link segment using the power spectral density with power back-off for the victim link segment and the worst case estimate of the total alien crosstalk noise that is coupled onto each differential pair of the victim link segment from the differential pairs of each of the plurality of disturber link segments.

13. The method of claim 12, further comprising comparing the signal-to-alien crosstalk noise ratio for each differential pair of the victim link segment to respective thresholds.

14. The method of claim 7, wherein each composite power spectral density is a worst case composite power spectral density that is formed by setting a power at each frequency based on a highest power level at the frequency in the plurality of power spectral densities.

15. The method of claim 7, wherein power levels in each composite power spectral density are adjusted to take into account any power back-off that each of the disturber link segments would apply when operating at the different line rates at which the disturber link segments may operate.

16. The method of claim 15, wherein different portions of a first of the composite power spectral densities are adjusted by different amounts to account for different power back-offs that apply when a first of the plurality of disturber link segments operates at different line rates.

17. A method of performing a multi-disturber alien crosstalk limited signal-to-noise ratio test, the method comprising:
   determining line rates at which a plurality of disturber link segments may operate;
   identifying a power spectral density associated with each determined line rate;
   combining at least two of the identified power spectral densities in a piecewise fashion to generate a composite power spectral density; and
   using the composite power spectral density to perform the multi-disturber alien crosstalk limited signal-to-noise ratio test.

18. The method of claim 17, wherein combining at least two of the identified power spectral densities in a piecewise fashion to generate the composite power spectral density comprises:
   forming the composite power spectral density by setting a power level at each frequency in the composite power spectral density as a highest power level at the frequency from amongst the power spectral densities associated with each determined line rate.

19. The method of claim 18, wherein combining at least two of the identified power spectral densities in a piecewise fashion to generate the composite power spectral density further comprises:
   reducing the set power level at each frequency in a worst case composite power spectral density by an amount of any power back-off that would apply for the disturber link segment operating at the line rate associated with one of the identified power spectral densities that was used to set the power level at the frequency in the composite power spectral density.

20. The method of claim 17, wherein a different composite power spectral density is used for each of the plurality of disturber link segments that takes into account power back-offs at which each disturber link segment would operate.

* * * * *